Jan. 19, 1954     L. C. MILLER     2,666,677

BEARINGS

Filed Oct. 12, 1949

Inventor:
Lester E. Miller.
By John W. Michael
Atty.

Patented Jan. 19, 1954

2,666,677

UNITED STATES PATENT OFFICE 2,666,677

BEARINGS

Lester C. Miller, Milwaukee, Wis., assignor to E. R. Wagner Manufacturing Company, Milwaukee, Wis., a corporation of Wisconsin Application October 12, 1949, Serial No. 120,950

1 Claim. (Cl. 308—238)

This invention relates to improvements in bearings particularly of the type having a metallic shell and a non-metallic synthetic bushing.

Such a synthetic bushing may be made of high molecular weight polyamides, such as described in U. S. Patent 2,246,086, or of high molecular weight ethylene polymers, such as described in U. S. Patent 2,246,092. When used under conditions where excessive heat is not generated, such a bushing has excellent frictional characteristics. In most practical usages the synthetic bushing is secured within a metallic shell. One method of accomplishing this is to mold the synthetic material into the core of a specially prepared metal backing member. However, such method is costly and impractical. Bearings produced by such method cannot compete, for example, with light-weight ball bearings used in the light wheel goods industry. Too many different molds are required to supply the varying "sizes" demand of the trade.

It is an object of this invention, therefore, to provide a bearing having a synthetic bushing which is comparatively inexpensive to manufacture, may be readily made in a variety of sizes, and may be made without use of molds and pressure injectors.

These objects are obtained by placing a synthetic plastic bushing into the metallic shell and forming an interlock between the shell and bushing by pressing a part of the material of the bushing into a recess or opening in the metallic shell. Such interlock is easily made and is also effective in holding the bushing from displacement with respect to the shell while in use. Many different ways may be used to make the interlock. For example, an expanding mandrel with a slight lateral projection may be inserted in the bushing and shell so that the projection alines with the recess or opening in the shell. As the mandrel is expanded the projection pushes a blurb of the synthetic material of the bushing into the recess thus forming the interlock. The bushing may be made of seamless tubing, drilled out solid rod stock, or formed from flat stock. Likewise, the synthetic bushings may be pre-cut lengths of standard pre-formed tubes, drilled out solid rod stock, or formed from standard flat strips or sheets. Thus a large variety of sizes of bearings may be obtained without use of special materials, molds, or intricate pressure-injecting machinery.

The novel features, which are considered characteristic of the invention, are set forth with particularity in the appended claim. The invention itself, however, both as to its organization and its method of operation, together with additional objects and advantages thereof, will best be understood from the following description of specific embodiments when read in connection with the accompanying drawing, in which:

Figure 1:
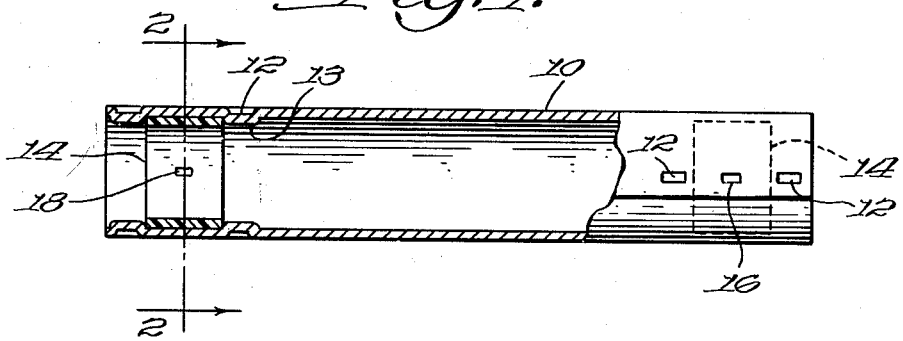
Fig. 1 is a view partly in section and partly in side elevation of a bearing embodying the present invention.
Figure 2:
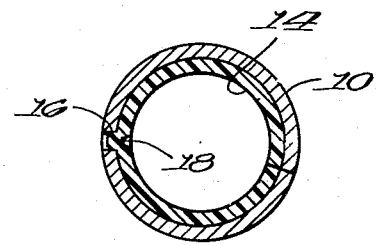
Fig. 2 is a slightly enlarged sectional view taken on line 2—2 of Fig. 1.

The bearings herein described are particularly adapted for use as the spacer or hub for light-weight wheels, such as used on baby carriages, children's velocipedes, and the like. However, different embodiments may be used for other bearing purposes. Referring to the drawings by reference numerals the bearing of Figs. 1 and 2 comprises a metal casing 10 within which is secured two non-metallic synthetic bushings 14. It is preferable to make the bushings 14 from a standard strip of plastic material known to the trade as nylon and obtainable from E. I. du Pont de Nemours & Co. (Inc.). The strip is cut in desired lengths and the lengths curled to form a hollow cylinder by methods well known in the art. The casing 10 is made of strip steel curled into a hollow tube by usual methods, and as shown in the drawings, the opposite ends of the strip are arranged in abutting relation. However, before completing the curling, slots 16 are cut in the strip of metal, one slot for each bushing. It is also preferable to form on the inside of the casing 10 a series of lugs or protuberances 13. These lugs may be made by pressing recesses 12 from the outside of the casing. There are four lugs for each bushing arranged in diametrically disposed pairs. The tabs of each pair are spaced apart the length of the bushing and thus engage the ends thereof to locate it in proper place within the casing and to assist in keeping it from having longitudinal movement relative to the bushing.

With the bushings in place a slug or blurb 18 is pressed out of the walls of the bushings into the slot 16 to interlock the bushings with the casing and prevent relative rotation therebetween. There are many ways of pressing or extruding the portion or slug 18 from the wall into the slot. An expanding mandrel with a small projection may be placed within the bushing with the projection alined with the slot 16. As the mandrel is expanded the projection forces a blurb of the plastic material into the slot. A mandrel provided with a pin which can be projected laterally can likewise be used in a similar manner. Another method consists of placing the strips of plastic against the strip of metal before the metal is completely formed into a casing, pressing the slug of plastic into slot by any type of well known punch, and then completing the curling of the metal casing by bringing the edges together. When using this latter method the slot 16 should be confined to that portion of the curled casing substantially opposite the abutting edges.

Figure 4:
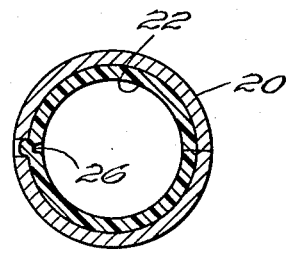
Fig. 4 is a slightly enlarged sectional view taken on line 4—4 of Fig. 3.
Figure 3:
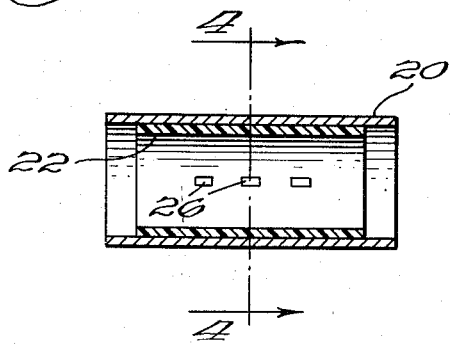
Fig. 3 is a sectional view of a bearing embodying a slight modification of the present invention.

In the modification of Figs. 3 and 4, the metallic casing 20 has only one synthetic bushing 22 which is almost as long as the casing. In such construction it is not necessary to use the lugs or locating protuberances as the bushing may be held from both ends while the slugs 26 are being pressed into the slots in the casing. It is advisable but not necessary to use three spaced slugs or blurbs in the complete interlock as the interlock in this bearing holds the bushing or liner against longitudinal as well as rotational movement with respect to the casing. The slugs 26 are pressed into the slots in the same manner as the slugs 18 with the exception that a gang type of tool or mandrel may be utilized so that all three slugs are made at the same time.

Although only several embodiments of the invention are shown and described herein, it will be understood that this application is intended to cover such other changes or modifications as come within the spirit of the invention or scope of the following claim; for example, the slots 16 are also equally effective if their longitudinal axes are at ninety degrees to the longitudinal axis of the casing and the protuberances 13 may also be made round or square and can be more or less in number so long as they properly locate the bushing.

I claim:

A bearing comprising a tubular shell of sheet metal having apertures formed in the side wall thereof, there being one such aperture adjacent to but spaced from each end of the shell, the inner surface of said shell having longitudinally spaced, locating protuberances, said protuberances being arranged in pairs at opposite ends of the shell with the protuberances of the respective pairs disposed on opposite sides of the respective apertures, bushings of synthetic plastic sheet material within said shell, there being one such bushing between each pair of said locating protuberances with the opposite end portions of the bushings engaging the respective locating protuberances and with the outer surface of each bushing engaging the inner surface of said shell, and an interlock between said shell and bushings comprising an integral protuberance on each bushing extending into the aperture in said shell.

LESTER C. MILLER.

References Cited in the file of this patent

UNITED STATES PATENTS

| Number | Name | Date |
| --- | --- | --- |
| 1,923,892 | Skillman | Aug. 22, 1933 |
| 2,215,523 | Haushalter | Sept. 24, 1940 |
| 2,227,969 | Haushalter | Jan. 7, 1941 |
| 2,324,083 | Holmes | July 13, 1943 |
| 2,324,997 | Brown | July 20, 1943 |
| 2,459,598 | Stott | Jan. 18, 1949 |